United States Patent [19]

Casasent et al.

[11] 4,308,521

[45] Dec. 29, 1981

[54] MULTIPLE-INVARIANT SPACE-VARIANT OPTICAL PROCESSING

[75] Inventors: David P. Casasent; Demetri Psaltis, both of Pittsburgh, Pa.

[73] Assignee: The United States of America as represented by the Secretary of the Air Force, Washington, D.C.

[21] Appl. No.: 11,585

[22] Filed: Feb. 12, 1979

[51] Int. Cl.³ .......................... G06K 9/40; G06G 9/00
[52] U.S. Cl. ...................... 340/146.3 P; 340/146.3 Q; 350/162 SF; 364/515; 364/822; 364/826
[58] Field of Search ................. 340/146.3 P, 146.3 Q; 364/517, 571, 572, 574, 576, 604, 726, 728, 731, 822, 826; 350/162 SF, 162 R

[56] References Cited

U.S. PATENT DOCUMENTS

| | | | |
|---|---|---|---|
| 3,270,188 | 8/1966 | Ares | 364/517 |
| 4,084,255 | 4/1978 | Casasent et al. | 350/162 SF |
| 4,138,190 | 2/1979 | Bryngdahl | 350/162 SF |
| 4,153,336 | 5/1979 | Minami et al. | 350/162 SF |

*Primary Examiner*—Leo H. Boudreau
*Attorney, Agent, or Firm*—Donald J. Singer; Sherman Goldman

[57] ABSTRACT

A multiple-invariant, space variant optical processor in which two functions described by any number of separate distortion parameters can be correlated with no loss in signal-to-noise ratio of the correlation. The unknown distortion parameters can also be determined in this scheme. Experimental confirmation of the key step, determination of the non-linear phase portion of a complex optical transform can be provided.

1 Claim, 2 Drawing Figures

MULTIPLE-INVARIANT SPACE-VARIANT OPTICAL PROCESSING

STATEMENT OF GOVERNMENT INTEREST

The invention described herein may be manufactured and used by or for the Government for governmental purposes without the payment of any royalty thereon.

BACKGROUND OF THE INVENTION

This invention relates to a multiple-invariant, space-variant optical processor or correlator and, more particularly, the invention is concerned with providing a multiple-invariant space-variant optical processor in which two functions, described by any number of separate distortion parameters, can be correlated with no loss in signal-to-noise ratio of the correlation. The unknown distortion parameters can also be determined in this scheme wherein the key step includes the determination of the non-linear phase portion of a complex optical transform.

The parallel processing and real-time features of optical processors have not been sufficient alone for these systems to see extensive use in pattern recognition. One of the reasons for this lack of practical use for optical correlators has been their lack of flexibility and the limited number of operations achievable in these processors. Hybrid optical/digital processors and space variant optical processors have increased the flexibility of these systems and included non-linear operations and space variant systems to the repertoire of optical processors. Recently, a space-variant, distortion-invariant optical correlator using coordinate transformations that allows correlation of two functions that are distorted versions of one another has been reported on (D. Casasent and D. Psaltis, Proc. IEEE, 65, 77 of 1977). However, this approach could only be applied to functions that were distorted by at the most, two separate distortions (for a two-dimensional system). Since more than two distortions occur in practice in image pattern recognition problems, optical processors must address such real issues if they are to be viable candidate pattern recognition systems. In the hereinafter described processor, the formulation of a multiple-invariant, space-variant optical processor that is invariant to multiple distortions is considered. A general theoretical analysis is presented first, followed by several specific cases and implementation methods.

Since these multiple-invariant systems will be formulated using space variant processing methods, specifically by use of coordinate transformations, the general formulation of a distortion-invariant, space variant processor is reviewed. A one-dimensional example is considered for simplicity. Let $f(x)$ be the original undistorted function. The distorted function $f'(x)$ is described by $$f'(x) = f(x') = f[g(x,a)], \tag{1}$$

where $g(x,a)$ is the distorting function and "a" is the unknown distortion parameter. To realize a space variant processor (invariant to the $g(x,a)$ distorting function), a coordinate transformation $\xi = h^{-1}(x)$ is applied to both functions. This produces two new functions $f_1(\xi)$ and $f'_1(\xi)$, which can be used in a conventional space invariant correlator to achieve correlation invariant to the distortion $g(x,a)$.

The coordinate transformation is chosen to convert the distortion into a shift $\xi_0$ for all values of "a." Given $g(x,a)$, the coordinate transformation can be found from:

$$\xi = h^{-1}(x) = -\frac{d\xi_0}{da} \int_{-\infty}^{x} \frac{\frac{\partial g(x,a)}{\partial x}}{\frac{\partial g(x,a)}{\partial a}} dx. \tag{2}$$

These new coordinate transformed functions $f_1(x)$ and $f'_1(x)$ are shifted versions of one another. Thus a conventional space invariant system can be used to correlate them. The intensity of the output correlation peak will be independent of "a" and the location of the output correlation peak will be proportional to "a". These basic principles are used in several stages in the present multiple invariant system.

Prior space variant processors using coordinate transformations can accommodate only one distortion parameter per axis (one distortion parameter for a 1-D system or two distortions for a 2-D system, or in general one distortion parameter per axis). If the distorting function depends on more than one parameter, then the distorted function is:

$$f'(x) = f(x') = f[g(x,a_1,a_2)], \tag{3}$$

where 1-D functions are used and the distortion function g is described by two distortion parameters $a_1$ and $a_2$. Then from Eq. (2), we see that since $h^{-1}(x)$ depends on $\partial g/\partial a_i$ and since $$\partial g/\partial a_i \neq \partial g/\partial a_j \tag{4}$$

each of the distortion parameters requires a different coordinate transformation $h^{-1}(x)$. It thus follows that the maximum number of distortion parameters that coordinate transformation processing one accommodate equals the number of dimensions of the processing system. In this context, a distortion is "multiple" if it is described by more parameters than coordinate transformation processing can accommodate.

When the distorted function is described by Eq. (3), we can achieve multiple invariance by: (a) scanning through all values of the additional distorting parameter, or (b) elimination of the additional distorting parameter by filtering in the transform plane.

The first approach involves construction of a number of systems invariant to one of the parameters (say $a_1$), with each system corresponding to one value of the second parameter $a_2$. If these systems cover all values of $a_2$, the output of one of them will be the same for all values of $a_1$ and $a_2$ for all input functions related by Eq. (3). This approach has been used in multiple holographic matched spatial filter systems, conventional multichannel Doppler signal processors, and in optical correlators using mechanical movement of components to effect a scale or rotational search. However, these solutions require a large processing space (if parallel) or are slow (if sequential).

The second approach is more attractive. It uses the fact that a shift in the input coordinates can be transformed into a linear phase factor in Fourier transform space. Elimination of this phase factor also eliminates any shifts in the input coordinates. Until now only the formation of the magnitude of the Fourier transform has been suggested as a method of achieving multiple invariance. We consider this formulation and its shortcomings in detail below.

With the reference function f(x) and the distorted input function f'(x) defined by Eq. (3), we can realize multiple invariance by first applying the transformation $x = h(\xi)$ to f'(x). This transformation must satisfy $$g(x, a_1 a_2) = g[h(\xi - \xi_0), a_2], \quad (5)$$

where $\xi_0 = \xi_0(a_1)$ is a constant depending only on the unknown distortion parameter $a_1$. The transformation $x = h(\xi)$ is determined from Eq. (2). This yields a new function:

$$f''(\xi - \xi_0, a_2) = f\{g[h(\xi - \xi_0), a_2]\}. \quad (6)$$

If we attempted to correlate f and f'' in a conventional space invariant processor, the peak intensity of the correlation will fluctuate as $a_2$ changes. Using a 2-D multichannel processor, each channel can be adjusted to correspond to different $a_2$ values. This will solve the 1-D problem presently being discussed but not the 2-D version of it.

To address the real problem, elimination of the distortion parameter $a_1$, we form the Fourier transform of f and f''. This yields $$[f''(\xi - \xi_0, a_2)] = \exp(-j\omega\xi_0)F''(\omega), \quad (7)$$

where F'' is the Fourier transform of f'' and $\omega$ is the radian spatial frequency variable in the Fourier transform plane. If we form the magnitude of the Fourier transform of f'', we will have removed the dependence on $a_1$. We can then retransform $F''(\omega)$ and recover f'' independent of $a_1$. This new f'' function and f can then be correlated, except that we have lost the phase of $F(\omega)$ and hence potentially useful information about f'. The magnitude of the Fourier transform represents the frequencies present in the input and the phase of the Fourier transform is affected by the distribution of these frequencies in the input. Thus some information is lost, since two functions with the same frequency content but different spatial distributions of these frequencies could produce identical results. This could lead to false correlations for such functions. The extent of this as a problem depends upon the specific functions and application.

However, two processors can be cascaded as in FIG. 1. The first processor consists of a coordinate transformation that converts $a_1$ to a shift by $\xi_0$ as before. The magnitude of the Fourier transform of this function (together with f subjected to the same transformation and Fourier transform magnitude operation) can then be used as the input to a correlator invariant to $a_2$ (as $a_2$ affects the magnitude of the Fourier transform). The location of the output correlation peak will then be proportional to $a_2$ as in conventional space variant processing by coordinate transformations.

f and f' (the original distorted function) are then used as inputs to a second space variant correlator (invariant to $a_1$). This second correlator is made adjustable so that it responds to different $a_2$ values. The output of the second correlator then provides a correlation invariant to $a_1$ and $a_2$ and the location of the output correlation peak is proportional to $a_1$. Thus $a_1$ and $a_2$ can be determined and multiple distortion achieved in this system.

This method has several limitations besides the loss of phase information associated with the formation of the magnitude of the Fourier transform. First, the coordinate distortion described by $a_2$ may or may not be preserved as a coordinate transformation in Fourier space. Furthermore, in the presence of noise, the magnitude of the Fourier transform is not completely unaffected by a shift since interference occurs between the signal and the noise.

DESCRIPTION OF A PREFERRED EMBODIMENT

The major problem with achieving multiple invariance by forming the magnitude of the Fourier transform of the coordinate transformed function was the loss of phase that occurred. The hereinafter disclosed invention describes a method whereby the phase can be extracted from a complex wavefront. For this present application, we describe this phase extraction process as follows.

At the input plane we record $f(x-x_0) + f(-x+x_0)$ and detect the magnitude of its Fourier transform on a TV camera. After thresholding the output signal with a limiter and normalizing the width of all fringes by a monostable in the video line, we obtain a function $T(\omega)$ whose derivative is:

$$dT(\omega)/d\omega = [S\text{ in}(q)][d\phi(\omega)/d\omega + x_0] \quad (8)$$

where $\phi(\omega)$ is the phase of the Fourier transform $F(\omega)$ of f(x) and q is a constant.

Recall that the phase of the Fourier transform of the function in the multiple invariant correlator contains a portion that is non-linear in $\omega$ (due to the spatial distribution of the function itself) and a portion that is linear in $\omega$ (due to the location of the function in the input plane). By taking the Fourier transform of Eq. (8), the dc term is proportional to the shift in the input coordinates. This value can then be used to properly position the input function. Alternatively, the derivative of Eq. (8) can be formed (this eliminates the constant term $x_0$ and all linear phase terms in the transform) and integrated twice. This yields the desired phase function free of all linear terms. This phase function can then be combined with the magnitude of the Fourier transform, and inverse transformed to reconstruct the input function free from a shift.

Figure 1:
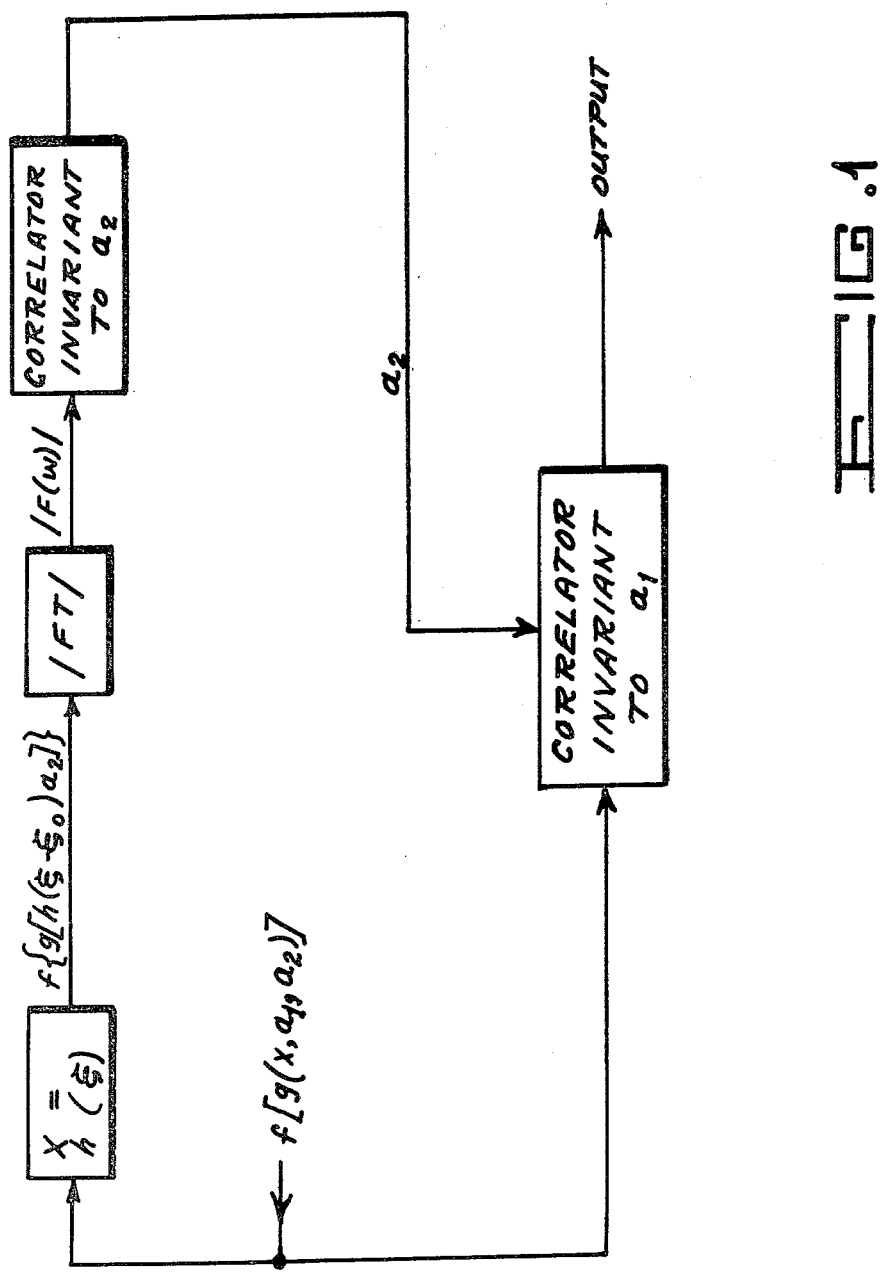
FIG. 1 is a schematic diagram of a multiple-invariant, space-variant optical correlator using the magnitude of the Fourier transform.
Figure 2:
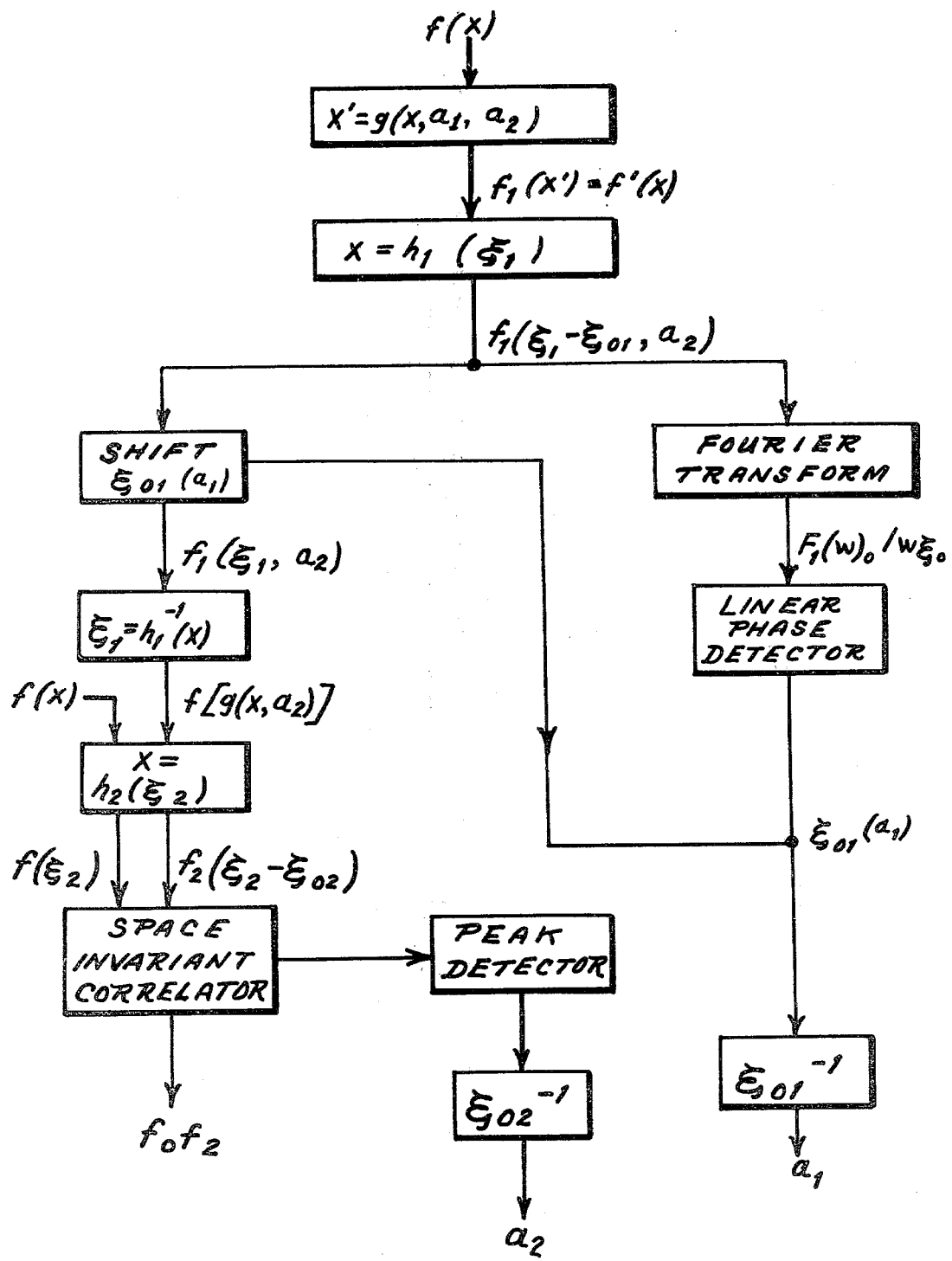
FIG. 2 is a schematic block diagram of a multiple-invariant, space-variant optical correlator with no phase loss of information.

The schematic block diagram of a multiple invariant correlator that avoids the phase loss problems of the prior system is shown in FIG. 2. Recall that the object of this system is to correlate two functions: f'(x) defined by Eq. (3) and the undistorted function f(x) and to determine the unknown distortion parameters $a_1$ and $a_2$. For simplicity, only the f'(x) channel of this system is shown in FIG. 2. The undistorted reference function f(x) is operated upon similarly.

As shown in FIG. 2, a coordinate transformation $x = h_1(\xi_1)$ is applied to the distorted input function $f'(x) = f(x')$, where from Eq. (3)

$$x' = g(x, a_1, a_2). \quad (9)$$

The coordinate transformation $\xi_1 = h^{-1}{}_1(x)$ affects only the distortion parameter $a_1$ and converts its effect to a shift by $\xi_0$ in the $\xi_1$ coordinate, such that:

$$g[h_1(\xi_1),a_1,a_2] = g_1(\xi_1 - \xi_{01}, a_2), \tag{10}$$

where $\xi_{01} = \xi_{01}(a_1)$ is a constant dependent on the unknown parameter $a_1$ only. The Fourier transform of $$f_1(\xi_1 - \xi_{01}, a_2) = f[g_1(\xi_1 - \xi_{01}, a_2)] \tag{11}$$

is $F(\omega)\exp(j\omega\xi_{01})$. Using the linear phase extraction scheme of the first three paragraphs under the DESCRIPTION OF A PREFERRED EMBODIMENT, we can determine $\xi_{01}(a_1)$ and hence $a_1$.

If we use the $\omega_{01}(a_1)$ value found from the phase extraction system to shift $f_1(\xi_1 - \xi_{01}, a_2)$, we obtain $f_1(\xi_1, a)$. Applying the inverse transform $\xi_1 = h_1^{-1}(x)$ to this function we obtain:

$$f\{g_1[h_1^{-1}(x), a_2]\} = f[g(x, a_2)], \tag{12}$$

which is now independent of $a_1$.

We can now apply conventional space variant correlation by coordinate transformation to this function and $f(x)$. We achieve this by applying the coordinate transformation $\xi_2 = h_2^{-1}(x)$ to both $f(x)$ and $f[g(x, a_2)]$, where $\xi_2$ is selected to satisfy Eq. (2). These two new coordinate transformed functions $f(\xi_2)$ and $f(\xi_2 - \xi_{02})$ (where $\xi_{02} = \xi_{02}(a_2)$ is a constant dependent on the unknown $a_2$ only) are then used as inputs to a conventional space invariant correlator. The output correlation peak is invariant to the distortion described by Eqs. (3) and (9). The location of the output correlation peak is proportional to $\xi_{02}$ and hence to $a_2$. Thus the desired distortion invariant correlation has been realized and the unknown distortion parameters $a_1$ and $a_2$ determined.

Experimental verification of the results hereinbefore disclosed is described in our article entitled Multiple-Invariant Space-Variant Optical Processors, appearing in Applied Optics, Vol. 17, No. 4, pages 655–659 including the references cited therein.

Although the invention has been illustrated in the accompanying drawing and described in the foregoing specification in terms of a preferred embodiment thereof, the invention is not limited to this embodiment. It will be apparent to those skilled in the art that certain changes modifications and substitutions can be made without departing from the true spirit and scope of the appended claims.

Having thus set forth the nature of our invention, what we claim and desire to secure by Letters Patent of the United States is:

1. A multiple invariant space variant optical processing method for performing optical correlations on input signals having known multiple distortions comprising the steps of:
   (a) performing a particular coordinate transformation that is related to one of said multiple distortions on the signal having multiple distortions;
   (b) performing an optical Fourier transformation on the coordinate transformed signal;
   (c) extracting the linear part of the phase of the Fourier transformed signal for said one of said multiple distortions;
   (d) repeating the steps of performing a coordinate transformation, performing an optical Fourier transformation and extracting the linear part of the phase of the Fourier transformed signal on the resultant signal from the extracting step for each of said known multiple distortions; and
   (e) correlating the resultant signal, free from said known multiple distortions, with an undistorted reference signal.

* * * * *